United States Patent [19]

Latta, Jr. et al.

[11] 4,107,112

[45] Aug. 15, 1978

[54] EPOXY RESIN SOIL STABILIZING COMPOSITIONS

[76] Inventors: Laurence Latta, Jr.; John B. Leonard, Jr, both of P.O. Box 3506, Beirut, Lebanon

[21] Appl. No.: 599,383

[22] Filed: Jul. 28, 1975

[51] Int. Cl.$^2$ ............... C08L 91/00; C08L 91/04; E01C 7/30; E02D 3/14
[52] U.S. Cl. ............... 260/18 EP; 61/36 C; 61/36 R; 166/295; 260/18 PF; 260/29.2 EP; 404/75; 404/76; 47/58; 47/9; 47/DIG. 10
[58] Field of Search ............... 260/18 EP, 29.2 EP, 260/18 PF; 61/36 R, 36 C; 404/75, 76; 166/295; 47/DIG. 10

[56] References Cited

U.S. PATENT DOCUMENTS

| | | | |
|---|---|---|---|
| 2,735,829 | 2/1956 | Wiles et al. | 404/76 |
| 2,956,034 | 10/1960 | Simpson | 260/18 EP |
| 3,012,485 | 12/1961 | Bradley | 260/18 EP |
| 3,202,621 | 8/1965 | Street | 260/18 EP |
| 3,284,390 | 11/1966 | Scheibli et al. | 260/18 EP |
| 3,334,555 | 8/1967 | Nagin et al. | 404/75 |
| 3,416,604 | 12/1968 | Rensvold | 61/36 C |
| 3,425,975 | 2/1969 | Barrett | 260/18 EP |
| 3,446,762 | 5/1969 | Lopez et al. | 260/18 EP |
| 3,772,228 | 11/1973 | Allen | 260/18 EP |
| 3,810,855 | 5/1974 | Tugukuni et al. | 260/18 EP |
| 3,825,513 | 7/1974 | Rostler | 404/76 |
| 3,888,808 | 6/1975 | Downs et al. | 260/18 EP |
| 3,974,113 | 8/1976 | Sassano et al. | 260/18 EP |
| 3,975,322 | 8/1976 | Reinshagen et al. | 260/18 EP |
| 4,000,781 | 1/1977 | Knapp | 166/295 |

*Primary Examiner*—Allan Lieberman

[57] ABSTRACT

A method of stabilizing soil, such as sub-bases, bases and wear courses of roads and airport runways, sand dunes and other loose, particulate material, which includes mixing an epoxy resin ester of unsaturated fatty acids with soil, preferably at the optimum moisture content of the soil, in ratios of as little as one part of chemical to 200 parts of soil, with the amount depending on the use. Optionally, small but effective quantities of cement may be added to the composition in the range of about 2 to 20% of the weight of the soil. A soil coating or top dressing may be applied to the resultant structure if desired.

15 Claims, No Drawings

EPOXY RESIN SOIL STABILIZING COMPOSITIONS

This invention relates to soil stabilization, and specifically to a method of forming sub-bases, bases and wear courses of roads and airport runways, stabilizing sand dunes and other loose, particulate material, reforestation, and agricultural reclamation, by upgrading, in all cases, existing, in situ materials.

BACKGROUND OF THE INVENTION

Numerous methods of stabilizing soil have been developed and put into commercial use, but invariably said methods have not been universally applied to a large number of quite dissimilar end uses, such as construction, land contour control, reforestation, and agricultural soil reclamation, or have enjoyed wide acceptance in only a rather specific field, such as oil well packing. A soil stabilization system applicable to a broad range of fields and which is long lasting, inexpensive, and quick and simple to apply with low skilled labor has not yet been developed for universal application.

Petroleum derivatives are widely used in construction work, such as the formation of sub-bases, bases, and wear courses for roads, airport runways, canal linings, drainage ditches, industrial areas, parking areas, and similar uses, but almost invariably the material cost is so great and/or the level of labor skill and application costs so high that such projects are only feasible when a relatively high cost per square yard of completed structure can be justified. In the road building industry, for example, the use of polyester and polyvinyl plastics has been quite extensive, but usually only as a top dressing or surface coating applied to a wear course of a road which has been built by more conventional methods.

Petroleum derivatives are also widely used in land contour control, but the applied material has, when judged on a cost-effectiveness basis, been only partially satisfactory since low cost materials usually provide only short term protection of a few months or perhaps a year at most, and more highly refined products, which produce more long lasting results, are invariably too expensive for large projects, such as stabilization of several hundred acres of soil in a single job.

SUMMARY OF THE INVENTION

The invention provides a stabilized soil structure, such as a sub-base, base, and/or wear course of a road or airport runway, a thin membrane-like protective cover over a free form base, such as a sand dune, or a sub-surface moisture barrier in an agricultural reclamation project, and a method of construction thereof which is long lasting, economical to apply and maintain, requires only conventional equipment and a low level of labor skill to apply, and which makes possible attainment of secondary objectives, such as color delineation and reforestation, with little or no change in cost or mode of application.

The invention specifically includes the upgrading of in-situ particulate soils by admixture of said soils with a chemical composition which can be shipped to the job site in concentrated form for formulation at the site with nearly any available water source, including fresh water, salt water, and brackish water, mixed in an optimum ratio with the water source, which ratio may be as low as one part chemical to 200 parts of water by weight, (if pre-mixed prior to application to the soil), thereafter mixed with the soil in the presence of an optimum moisture content, applied, compacted (if required), cured, and then used with or without final treatment. The final treatment may include application of a wear course of asphaltic or cement concrete, or an identical or a modified mixture of the chemical of the invention.

A preferred form of the chemical component of the invention may be described as an epoxy resin ester which is the reaction product of a bisphenol A-glycidyl ether type epoxy resin with linseed fatty acids in which the molar ratio of fatty acid to bisphenol A units is between about 0.5 to 1.0, together with free linseed fatty acids, a solvent, preferably a volatile solvent, an emulsifying agent, and water, the water being present in an amount of about one-third of the total weight of the chemical in its concentrated form prior to subsequent mixing with additional water prior to, or during, mixture with soil. It is preferred that the chemical include an emulsifier in the concentrated form. Driers may or may not be used, depending to some extent on application conditions.

DESCRIPTION OF THE INVENTION

One important field of use of the invention is the construction of sub-bases, bases, and wear courses for roads, airports, helicopter landing pads and other analogous uses in which the final structure must support direct or indirect bearing loads. The term "roads" and obvious variations thereof will be used hereafter to denote this field of use.

The invention is well adapted to the construction of roads in dry, arid climates, such as desert areas or, in a broader sense, in terrain in which the optimum moisture content for road building is lacking during available construction periods, usually the summer months in the Northern Hemisphere.

In the construction of, for example, a sub-base, for such a road, the following procedure is followed.

Soil samples are taken at a number of locations along the course. From these samples necessary soil data are determined including a sieve analysis, the plasticity index, AASHO classification, maximum dry density, optimum moisture content, and California Bearing Ratio percent, hereafter CBR, after compaction of a sample having optimum moisture content.

From this data the correct proportion of chemical to soil is determined. It will be understood that the invention is applicable to a wide variety of coarse, medium or fine gravels, sands, silts, or clays or any combination thereof, or, in broad terms, any non-agricultural soil. It should be noted, however, that certain uses which are analogous or auxiliary to agricultural uses are also within the scope of the invention as will appear in greater detail from this description.

Determination of the optimum proportion will be based on several factors including the strength required by the road designers and knowledge of the proportion which has been found to give satisfactory results in the same or similar applications. In making the determination a number of samples may be made using different proportions of chemical to soil, and tests, such as Marshall stability, tensile strength, tensile strain, and CBR penetration, will be run on the samples. Since the chemical is the single most expensive element in the structure, that proportion of chemical to soil will be selected in which the minimum quantity of chemical is required which will meet the specifications. A good soil requires less chemical than a bad soil, and a base course requires more strength than a sub-base. Good results will be obtained when the usage of the chemical, in concentrated form, lies in the range of about 0.1 to 1% by weight of chemical to soil. A typical quantity range is 1 to 8 cc chemical/1000 gms dry soil.

In field operation, the chemical is shipped to the job site in concentrated form in any convenient size container. Fifty-five U.S. gallon drums have proven to be efficient in use. The structure, which may for example be a road sub-base, is then formed as follows.

Upon arrival at the job site the chemical is prepared for addition to the soil. Preparation is accomplished by mixing the chemical in its condition as taken from a 55 U.S. gallon drum or other container with water. If, for example, it has been determined that the optimum moisture content of the soil is 15%, and only 2% moisture is present in the soil at the job site, the chemical is mixed with a sufficient quantity of water, which amount can be readily calculated at 13%, so as to provide a final moisture content of 15% in the soil-water-chemical mixture.

The chemical is miscible in all proportions with water, and usually only a minute or two of mixing by any conventional means, such as simple stirring or a recirculating pump, is all that is required to prepare the solution for mixing with soil. The water can be almost any condition, hot or cold, including salt water, fresh water or brackish water or, in essence, any type of water available at the job site subject only to unusual conditions such as an extremely high mineral content of a type which may adversely effect operation. Such waters are occasionally found in localized areas. The optimum moisture content to achieve maximum density may vary from about 2% to 22% by weight of soil. A typical ratio is 5% water; ie: 50 cc water/1000 gms soil. In this connection it should be noted that proportions should be stated in terms of the weight of water or the weight of chemical per given weight of soil; in terms of final, on-site application, the ratio of chemical and water to one another gives little or no meaningful information.

Manganese or cobalt acetate may also be added into the water as a drier-accelerator, if needed, according to weather conditions, and to speed up drying as required by the contractor. Amount can vary from 1/100 to 1/1000 by weight of drier to weight of chemical in concentrated form. It has been found that for most applications the best results are obtained using manganese acetate, and accordingly manganese acetate is the preferred drier.

The course is preferably graded and leveled by any conventional means. Thereafter a mixture of soil, water and chemical is formed, as by mixing in a pug mill or batch mixer, and deposited along the graded and leveled course.

The application of mix to the graded and leveled course may be done by using standard road equipment, such as Pettibone-Wood, Vogele, Barber-Greene, Koehring, or similar road building equipment, or, if not available, then standard graders, transit mixers or sprayers followed by compactors. Preferably the preceding layer is pre-compacted to the required density using standard compaction techniques.

After lay down, the mixture is compacted as quickly as possible, and preferably not later than three to five hours, to avoid loss of water and setting up before maximum density is reached through compaction. Care should be exercised to ensure that compaction pressures are applied substantially vertically, and forward pushing or shoving of the loose mixture is avoided. This may necessitate the use of a rubber wheel compactor followed by steel wheel vibrator compaction, or a similar combination of compaction equipment.

The raw mixture may be applied and compacted in a single layer. The range of depth can vary from about 3 to 30 cms. A typical base or sub-base can be 20 cms and a wear course may be 3 to 5 cms, though specifications may call for greater or lesser depths depending upon ultimate usage. If desired, multiple applications may be made, but experience has shown that in the large majority of jobs, multiple applications are not essential.

The raw mixture is preferably applied in still, dry weather. Usually the surface, following compaction, will be dry and will resist deformation to the touch within 5 to 6 hours after application, though the time may be lesser or greater depending on such factors as weather conditions and type of soil. For sandy soil, and assuming application on a hot day, 5 to 6 hours is a typical surface drying time.

After 24 hours of curing the course is usually ready to receive an upper coat, such as a base course (if the just completed structure is a sub-base) or a wear course. However, field curing time can range from 2 to 10 days depending on temperature, native soil, weather and other factors. For example, four days' curing may be required at 40° C, or 10 days' curing may be required at 30° C.

A primary road may require a 12-inch base; a secondary road may only require a 6-inch base, but these quidelines will vary from job to job. If the specifications require a base course on top of a sub-base, and the same soil is to be used in both course, the same or different proportions of soil, water and chemical may be used.

Typical rates of application for road base usage may vary between from about 110 to 440 U.S. gallons of chemical per 4,000 square yards of 6-inch thick base. On site dilution ratios of about 50 to 200 gallons of water per gallon of chemical have been used with excellent results. Rolling and compaction at the optimum moisture content for the soil should always be done to 100% minimum density.

Any suitable wear course may thereafter be applied on top of the base course or courses, including concrete, asphalt, or MC-70 (a petroleum road oil).

Alternatively, a top dressing can be applied to provide a flexible, tough, abrasion resistant surface. The resultant surface functions as a wear course in which a further increase in the compressive and tensile strengths of the base course have been increased. Colors, such as green or black, may be added to the top dressing to yield an appearance which is aesthetically pleasing or functional. After curing, the dressing forms a surface suitable for moderate airport traffic or highway traffic, or helicopter touchdown areas.

The top dressing may be a product similar, or identical to, the chemical above described as used in connection with the base course. Such a compound, which may optionally contain penetrants, hardeners, or other additives, depending upon the type of soil structure to which it is to be applied, is mixed with water prior to application. Any suitable application method may be used, including a simple overspray application. For example, a liquid-chemical tank truck having a spray bar in which a uniform pressure is maintained in the spray bar by gravity or pump pressure may be employed, with the amount of solution applied depending on the rate of volume discharge from the spray bar and the speed of the truck.

For best results one or two coats may be applied. For secondary roads the top dressing may be applied at a rate of from about 220 to 440 U.S. gallons per 4,800 square yards for a total of two coats. For slightly heavier usage, such as runways for light aircraft, a greater quantity of dressing may be required such as, for example, about 550 U.S. gallons per 4,800 square yards. In this event the two coates may be applied at a rate of about, for example, 220 U.S. gallons per 4,800 square yards in the first coat and 330 U.S. gallons per 4,800 square yards in the second coat. If the soil is suitable, only one coat, even at the heavier rates of application just mentioned, may be applied.

The following general examples of the use of stabilizing solutions to upgrade any type of marginal, non-agricultural soil to enable its use for construction purposes will further define the invention.

The chemical was mixed directly from the drum with water in the ratio of 45 cc of chemical to 50 cc of water. The water contained 0.1 gm cobalt acetate. The solution was then uniformly mixed into dry dune sand, ASSHO classification A-1, to a depth of about 20 cm, and then compacted.

Before treatment the dune sand had a CBR of 30 and a flexural strength of zero. After treatment, CBR was 120 and flexural strength was as follows: tensile strength was 14.0 kg/cm$^2$; tensile strain was $30 \times 10^{-4}$.

The resultant structure was used as a base for a road or airport.

In another application, the chemical was mixed with water in the ratio of 2 cc of chemical to 100 cc of water to which had been added 0.2 gm cobalt acetate drier. The resultant solution was mixed to a depth of 15 cc with silty soil and compacted to specification to form a sub-base.

After three days of curing, a base was layered over the sub-base, the base consisting of a three centimeter thick wear course which had been made by batch mixing a slurry composed of chemical to water in the ratio of 12cc of chemical per 50 cc of water for each 1,000 gm of sandy soil. After compacting uniformly, the wear course was permitted to cure approximately eight days before opening to traffic.

The resultant structure, composed of a base course and a wear course is suitable for use as a road or airstrip.

Optionally, a black coal tar emulsion may be sprayed over the wear surface at the rate of from 1 to 4 gals/sq m to serve as added protection against weathering and fuel spills.

In another application, plastic clayey soil was combined with Portland cement in the ratio of 1,000 gm of dry untreated soil to 30 gm of dry Portland cement. To this mixture was added a solution composed of 8 cc of chemical mixed with 150 cc water containing 0.2 gm cobalt acetate. The above composition was compacted to the design specification of 20 centimeters and permitted to cure.

The untreated soil had a soaked CBR of 5 and a flexural strength of zero. The treated soil had a soaked CBR of 97 and good flexural strength, namely a tensile strength of 3.7 kg/cm$^2$ and a tensile strain of $21 \times 10^{31}$ 4. The resultant structure is suitable for use as a base or sub-base for a road or airport.

Although cobalt acetate has been specified in the examples just given, it has now been concluded that manganese acetate will give equal or better results.

Specific examples of road bases built according to the above procedure are as follows:

EXAMPLE 1

A sample of dune sand was obtained and tested with the following results.

Tested Material: Dune Sand

Compacted in a 6" diameter cylinder
5 layers with 10 lbs. hammer, 18" drop
55 strokes each layer
(ASTM Method D 1557–64T)
Sieve Analysis:

| U.S. Sieve No. | Per Cent Finer by Weight |
|---|---|
| No. 20 | 100.0 |
| No. 40 | 99.9 |
| No. 60 | 96.5 |
| No. 100 | 60.2 |
| No. 200 | 1.2 |

Plasticity: Non-Plastic
AASHO Classification: A-3 (0) Fine Sand

| No. of Test | Type of liquid added | Optimum Moisture Content | Dry Density p.c.f. | C.B.R. % penetration 0.1" | 0.2" |
|---|---|---|---|---|---|
| 1 | Water | 13.5 | 105.6 | 22.8 | 33.0 |
| 2 | Chemical and Water* | 13.5 | 106.1 | 82.0 | 100 |

*Chemical was used at a concentration of 5cc/1000 gms. of soil.

After determination of the optimum moisture content and the optimum proportion of chemical to the soil, the same chemical was used at the job site and applied in the same manner as above described. A hard, tough base course resulted which, upon curing, was in condition for application of a wear course.

EXAMPLE 2

A sample of dredge soil was obtained and tested with the following results.

Tested Material: Dredge Soil

Compacted in a 6" diameter cylinder
5 layers with 10 lbs. hammer, 18" drop
55 strokes each layer
(ASTM Method D1557 – 64 T)

| Non-Plastic | Sand: | 69% |
| | Gravel: | 30% |
| | Fines: | 1% |

| No. of Test | Type of liquid added | Optimum Moisture Content | Dry Density p.c.f. | C.B.R. % penetration 0.1" | 0.2" |
|---|---|---|---|---|---|
| 1 | Water | 12.0 | 117.2 | 27.6 | 42.7* |
| 2 | Chemical + water | 11.0 | 117.2 | 44.0 | 81.0** |

*C.B.R. tested right after compaction.
**Cured 4 days at 50° C.

This soil, after treatment with a top dressing as above described, proved to be a highly abrasion-resistant pavement material for use as sidewalks, center dividers and parking areas.

Although the above examples are directed to road use and application in the manner earlier described, it will be understood that alternative, yet functionally similar, procedures may be employed for the above referred to analogous uses.

For example, the water-chemical compound may be mixed with the soil by use of multiple gang discs in several passes until homogonous in lieu of the pug mill or batch mixer method earlier described. After mixing, the compaction and top surface treatment earlier described may be carried out.

A suitable forming procedure for structures which are expected to be subjected to only intermittent loads, such as road shoulders and embankments, drainage ditches, road divider medians and airport shoulders, is as follows.

The chemical is applied at the rate of 110 to 220 U.S. Gallons per 4,800 square yards of soil to be treated with an appropriate water content. the appropriate water content is preferably that amount which, when added to the moisture content of the soil, equals the optimum moisture content. If a soil mixer of the multiple gang disc type as above described is unavailable, the soil may be raked to a depth of two inches to four inches and one-half of the chemical-water solution sprayed thereon. Thereafter the sprayed surface is compacted using a vibrator roller. Thereafter the remaining one-half of the chemical-water solution is sprayed and three or four days of curing time is allowed.

The result will be a smooth, tough abrasion resistant surface suitable for the intermittent use required in the above applications.

When the job specifications or field conditions require batch mixing, it has been found that conventional paving machines, such as any model of the Barber-Greene brand of paving machines having a vibratory screed may be successfully used.

Specific examples of chemical mixtures useable in the practice of the invention are set forth below. The individual components are stated on a weight basis. In each instance the mixture is described in its "concentrated" condition as that term is used in this specification, ie: in an as-shipped condition, and prior to dilution with water at the job site.

| Component | Example | |
|---|---|---|
| | A. | B. |
| Water | 40 | 40 |
| Volatile Solvent | 1.5 isopropanol | 1.5 isopropanol |
| Emulsifier | 1.5 Triton X100 | 1.5 Triton X100 |
| Epoxy resin ester | 29 Epoxy No. 1 | 29 Epoxy No. 2 |
| Other | 28 Methyl linoleate | 28 Methyl ester of linseed fatty acids |
| | C. | D. |
| Water | 33 | 35.5 |
| Volatile Solvent | 5 xylene | 5 xylene |
| Emulsifier | 2 Triton X100 | 2 Triton X100 |
| Epoxy resin ester | 30 Epoxy No. 2 | 57.4 Epoxy No. 2 |
| Other | 30 Methyl ester of linseed fatty acids | 0.1 Cobalt naphthenate |
| | E. | F. |
| Water | 28 | 35.5 |
| Volatile solvent | 6 toluene | 5 xylene |
| Emulsifier | 1.6 Triton X100 | 2 Triton X100 |
| Epoxy resin ester | 64.3 Epoxy No. 1 | 57.4 Epoxy No. 3 |
| Other | 0.1 Cobalt naphthenate | 0.1 Cobalt naphthenate |
| | G. | H. |
| Water | 33 | 40 |
| Volatile Solvent | 5 xylene | 1.5 butyl ether of ethylene glycol |
| Emulsifier | 2 Triton X100 | 1.5 Triton X100 |
| Epoxy resin ester | 30 Epoxy No. 4 | 29 Epoxy No. 1 |
| Other | 30 Methyl ester of linseed fatty acids | 28 Methyl linoleate |
| | I. | J. |
| Water | 33.5 | 33.5 |
| Volatile Solvent | 4.5 xylene | 4.5 xylene |
| Emulsifier | 1.5 Triton X100 | 1.5 Triton X100 |
| Epoxy resin ester | 22.5 Epoxy No. 7 | 22.5 Epoxy No. 7 |
| Other | 38 Methyl linoleate | 38 Methyl linoleate 0.2 Cobalt naphthenate |
| | K. | L. |
| Water | 33.5 | 35 |
| Volatile Solvent | 4.5 xylene | 6 toluene |
| Emulsifier | 1.5 Triton X100 | 2 Triton X100 |
| Epoxy resin ester | 22.5 Epoxy No. 2 | 25 Epoxy No. 4 |
| Other | 38 Methyl ester of linseed fatty acids | 31 Methyl linoleate 0.1 lead drier |
| | M. | N. |
| Water | 34.8 | 30 |
| Volatile Solvent | 0.7 toluene | 5 methylisobutyl ketone |
| Emulsifier | 1.5 Triton X100 | 2 Triton X100 |
| Eppxy resin ester | 62.9 Epoxy No. 6 | 62.9 Epoxy No. 5 |
| Other | 0.1 lead drier 0.01 Cobalt drier | 0.1 lead drier 0.05 Cobalt drier |

The epoxy resin esters are the reactin products of bisphenol A. - glycidyl ether type epoxy resin with fatty acids. The ingredients, ratios, and free fatty acid are as follows:

| Epoxy No. | Fatty Acid | Shell "Epon" No. | Molar Ratio, fatty acid to bisphenol A units | Free fatty acid, % |
|---|---|---|---|---|
| 1 | linoleic | 828 | 0.45 | 2.8 |
| 2 | linseed | 828 | 0.45 | 3.1 |
| 3 | linseed | 1001 | 0.49 | 5.3 |
| 4 | dehydrated castor | 834 | 0.86 | 8.8 |
| 5 | 40/60 soya/linseed | 864 | 0.69 | 7.2 |
| 6 | linseed | 1004 | 1.0 | 6.3 |
| 7 | linseed | 828 | 0.63 | 5.0 |

Water is present in an amount necessary to give a convenient viscosity for pumping and mixing, which is generally about 25%. Much higher percentage amounts are not detrimental, but amounts substantially higher than that which is needed to meet viscosity requirements are obviously uneconomical if it is desired to supply the user with a concentrate which the user will dilute with water at the time of application. The preferred water content in the concentrate is in the range of about 30% to 45% of the composition.

A volatile solvent is generally necessary to cut the viscosity of the epoxy resin so as to render it conveniently thin enough to mix and emulsify with the water. Solvents may be aromatic hydrocarbons such as benzene, toluene, xylene, etc., alcohols, ketones, alkoxy glycol ethers, or others. It is apparent that any solvent having the property of cutting viscosity and of stability in the final concentrate is suitable. Practical considerations, such as cost, low flammability, and wide availability make xylene the preferred volatile solvent.

It will be appreciated that any emulsifying agent or combination of agents which give a reasonable stability to the concentrate, and permit dilution with the water to be used at the job site will be satisfactory. There are of course hundreds of such agents and combinations. The species of agent(s) used is not critical; it need only perform the functions mentioned. It will be found that good results will be obtained with polyethoxylated phenols or polyethoxylated alcohols, such as the polyethyleneglycol ether (10 mole) of nonylphenol, or the polyethyleneglycol ether (8 mole) of decyl alcohol. Other satisfactory emulsifiers will be the polyethoxylated polypropylene glycols and polyethoxylated polyamines. Series of these various emulsifiers are sold under the tradenames "Triton", "Brij", "Pluronic", and "Tetronic", respectively, but it is not meant to limit the invention to these specific emulsifiers by the enumeration of the emulsifiers above mentioned.

The methods of making epoxy resin fatty acid esters are well known in the art, and need not be dealt with here in detail. It will be appreciated that a wide variety of unsaturated drying oil and semi-drying oil fatty acids may be substituted for the fatty acids of the examples, as well as combinations of such fatty acids. For example, the fatty acids of soya, tung, dehydrated castor, cottonseed, perilla, oiticica, or sunflower oils may be used. In cooking the resin oil mix, the molar ratio of fatty acid to the bisphenol A units of the epoxy resin is a maximum of about 1.1, and the unreacted fatty acid is held to no more than about 10%.

The procedure for formulating the chemicals of the invention may be varied widely. Examples of two possible methods of formulation are given below, these examples being applicable to Chemical A and Chemical B, above, respectively.

Chemical A 15.4 parts of Epon 1001, which is a commercial resin ester obtainable from the Shell Chemical Corporation, and which has a melting point of about 64°–76° C, a Gardner color of 8 maximum, a Gardner-Holdt viscosity of C-G, and an epoxide equivalent of approximately 450–525, are heated together with 13.6 parts of linseed fatty acids under a light nitrogen sparge at temperatures up to 500° F. The mixture is held at about 500° F until the free fatty acid content is 5.6%, calculated as linseed fatty acids, the total cooking time being about 5 hours. After cooling to about 80° C, or somewhat below, 28 parts of methyl linoleate and 1.5 parts of mono-butyl ether of di-ethylene glycol (Butyl Carbitol) are mixed together with the resin ester at a temperature in the range of room temperature up to about 80° C. Forty parts of water and 1.5 parts of Triton X-100, an emulsifying agent, comprising an ethoxylated alkyl phenol having about 10 moles of ethylene oxide condensed with each phenol, were mixed together in a separate vessel. Thereafter, the resin ester mixture was added slowly to the water solution with good stirring to create an emulsion, which is typified by the above set out Chemical A.

Chemical B

Fifty-six parts of Epon 1004, which is a commercial resin ester obtainable from the Shell Chemical Corporation, and which has a melting point of about 95°–105° C, a Gardner color of 6 maximum, a Gardner-Holdt viscosity of Q-U, and an epoxide equivalent of approximately 870–1025, are heated together with 44 parts of linseed fatty acids until the free fatty acid content is 7.5%, calculated as linoleic acid. The mixture is heated in a closed kettle under a nitrogen gas sparge. The cooking time should be approximately 5 hours at temperatures up to 500° F. After cooling to about 70° C, 57.5 parts of the resulting resin ester was mixed with 5 parts of xylene. Two parts of Triton X-100 are then dissolved in 35 parts of water and this solution heated to about 70° C. Then the xylene reduced resin is added to the water slowly and in the presence of vigorous agitation to produce the final emulsion.

Although two possible modes of preparing the chemicals in concentrated form have been described, it will be understood that the procedures are given merely by way of example, and any other procedures which yield the chemical in a form suitable for eventual field use, after dilution, are acceptable, no claim being made to the manner of formulating the chemical as comprising the inventions per se.

EXAMPLE 3

A sample of silty sand was obtained and tested with the following results.

| Tested Material: | Silty Sand | |
|---|---|---|
| Atterberg Limits | | |
| Liquid Limit | Plastic Limit | Plasticity Index |
| Non-plastic | Non-plastic | Non-plastic |

Density
Loose density = 1.52 g/cm³
CBR Test

| Remarks | Molding moisture content, percent | Moisture content at end of test, percent | Corrected CBR%, Soaked | Swell percent |
|---|---|---|---|---|
| Untreated | 7.60 | 8.38 | 24.7 | 0.04 |
| Treated | 4.60 | 10.99 | 16.8 | 0 |
| Treated | 7.60 | 8.93 | 94.0 | 0 |
| Treated | 10.0 | 10.68 | 7.5 | 0.16 |

Note: optimum moisture content was 7.6%

The molds were compacted in five layers with 55 blows per layer at different water contents. Unless indicated the chemical was mixed with the moulding water in the amount of 1.4 cm³ per 1000 gm of loose soil. The moulds with the chemical were cured in an oven at 40° C for 48 hours before soaking. A surcharge of 10 lbs. was used and all moulds were soaked in water for 4 days before testing.

Of particular significance is the fact that a very low concentration of chemical, i.e.: only 1.4 cc/1000 gm of loose sand produced almost a four fold increase in CBR percentage as will be noted from a comparison of the results in lines 1 and 3 of the CBR Test summary which reflect the results of treated and untreated soil at optimum moisture content; i.e.: 24.7 v. 94.0. The results also indicate the importance of determining and using the optimum moisture content.

EXAMPLE 4

Another sample of silty sand was obtained and tested with the following results.

| Tested Material: | Silty sand, yellow-red, uniform |
|---|---|
| Plasticity: | Non-plastic |
| AASHO Classification: | A-3 (0) |
| Maximum Dry Density: | 105.5 lb./cu. ft. |
| Optimum Moisture Content: | 3.5% |

| No. of Test | H₂O, % | Soak, hrs., Before Testing | Chemical Rate | Cure Conditions | CBR |
|---|---|---|---|---|---|
| 1a | 5 | None | None | None | 12.5 |
| 1b | 5 | None | None | None | 16.5 |
| 2a | 5 | 8 | None | None | 10.0 |
| 2b | 5 | 8 | None | None | 15.0 |
| 3a | 3.5 | 8 | 3.2cc/Kg | 100° C; | 27.9 |
| 3b | 3.5 | 8 | 3.2cc/Kg | 24 hrs. | 24.8 |
| 4a | 3.5 | None | 3.2cc/Kg | 100° C; | 77.2 |
| 4b | 3.5 | None | 3.2cc/Kg | 24 hrs. | 67.6 |
| 5a | 3.5 | None | 1100 gal/acre, 20 cm. deep | room temp. for 4 hrs.; 100° C for 48 hrs.; cool to room temp. | 75.6 |
| 5b | 3.5 | None | 1100 gal/acre, 20 cm. deep | room temp. for 4 hrs.; 100° C for 48 hrs.; cool to room temp. | 100 |

| | | | | | |
|---|---|---|---|---|---|
| 6a | 3.5 | 24 | 1100 gal/acre, 20 cm. deep | room temp. for 4 hrs.; 100° C for 48 hrs.; cool to room temp. | 100 |
| 6b | 3.5 | 24 | 1100 gal/acre, 20 cm. deep | room temp. for 4 hrs.; 100° C for 48 hrs.; cool to room temp. | 100 |
| 7a | 3.5 | 24 | 1375 gal/acre, 20 cm. deep | room temp. for 4 hrs.; 100° C for 48 hrs.; cool to room temp. | 100 |
| 7b | 3.5 | 24 | 1375 gal/acre, 20 cm. deep | room temp. for 4 hrs.; 100° C for 48 hrs.; cool to room temp. | 100 |

The "a" test was at 0.1 inch penetration; the "b" test was at 0.2 inch penetration. Specimens 1a and 1b were tested immediately after compaction.

It will be noted that a CBR of over 100 was obtained from the method and structure of the invention, as contrasted to a CBR of approximately 15 for untreated soil. As those skilled in the art will appreciate, the CBR of the treated soil, when soaked after treatment with the chemical, had a higher CBR, that is, a greater puncture resistance and bearing strength, than asphalt.

From the above examples, and particularly examples 3 and 4, it will be apparent that one additional benefit of the invention is the ability to improve, ie: upgrade, marginal soils of the type that, prior to treatment, were not of sufficient quality for road building. This is accomplished with very small quantities of chemicals; amounts in the range of 1 to 10 cc chemical to 1,000 gms of soil have been found to be effective.

EXAMPLE 5

An airstrip having a 900 m × 30 m runway was constructed using the following material.

| Material: | gravelly - sand (A-1, USHRBC), SW group of the Unified System |
|---|---|

Sieve Analysis:

| U.S. SIEVE NO. | PERCENT FINER BY WEIGHT |
|---|---|
| 3/4" | 100.0 |
| 1/2" | 98.5 |
| 3/8" | 96.1 |
| No. 4 | 86.2 |
| No. 10 | 65.6 |
| No. 20 | 51.3 |
| No. 40 | 39.7 |
| No. 60 | 29.2 |
| No. 100 | 17.0 |
| No. 200 | 2.6 |

| Density: | 146.2 lb/cu. ft. (maximum dry) |
|---|---|
| Optimum Moisture: | 7.2% |

CBR Data

| Test No. | Chemical, Rate | CBR |
|---|---|---|
| 1a | 0 | 34.3 |
| 1b | 0 | 74.5 |
| 2a | 220 gal/acre, loose soil, 6 inches thick | 62.7 |
| 2b | 220 gal/acre, loose soil, 6 inches thick | 96.2 |

The soil was cured for 4 days at 60° C before testing in all cases. The "a" test was at 0.1 inch penetration; the "b" test was at 0.2 inch penetration.

The strength of the soil was markedly increased upon chemical treatment, and after treatment, was put into use as a runway for aircraft and has been in continuous use for a period of time. The U.S. Corps of Engineers (standard EM 1110-45-302) permits the use of a base course material having a design CBR of 80 for tire pressures of 100 psi. The runway was constructed using the Khoering system, as above described, and, after laying, a top dressing consisting of a coat of chemical diluted with mineral spirits, such as turpentine, and black coal tar was applied by spraying. A hard, smooth, waterproof and abrasion resistent surface resulted.

EXAMPLE 6

Another airstrip having a 900 m. × 30 m. runway was constructed from the following material and using the below descibed procedure.

| Material Classification: | |
|---|---|
| H.R.B. Classification | A-2-4 (0) |
| Unified Classification | SP |
| Uniformity Coefficient | 3 |

Grain Size Analysis:

| Sieve No. | Sieve Size, mm | % Finer by Weight |
|---|---|---|
| 1/2" | 12.7 | 100.0 |
| 3/8" | 9.52 | 99.8 |
| No. 4 | 4.76 | 99.3 |
| No. 10 | 2.00 | 95.1 |
| No. 20 | 0.84 | 89.3 |
| No. 40 | 0.42 | 77.6 |
| No. 60 | 0.25 | 69.4 |
| No. 100 | 0.149 | 43.8 |
| No. 200 | 0.074 | 13.7 |

All the results are the average of three tests.
Atterberg Limits: Non-plastic

The soil was treated at the rate of 1100 gal/acre, 6 inches deep, using a Khoering machine. After top treatment with a dressing similar to that used in the runway of Example 5, a hard, smooth waterproof and abrasion resistant surface resulted.

The quality of the aggregate structure can be further increased by the use of cement in small but effective amounts. It appears that a degree of synergism is achieved when cement is used in conjunction with the chemical of the invention, since a small amount of cement plus a small amount of the chemical appears to produce better results than a large amount of either.

The better results appear to be attributable to the flexibility imparted to the base structure by the chemical. Specifically, it is known that axle overloads will cause cracking of a conventional concrete structure, with the cracking commencing at the bottom of the structure and progressing upwardly. The cracking is attributable to the fact that cement structures are brittle and have very little flexibility, particularly in tension. To avoid cracking, the thickness of the structure may be increased, but this precaution substantially increases the cost of the structure which is substantially over designed.

The use of a small but effective quantity of the chemical in conjunction with cement substantially increases the flexibility of the structure, and thereby avoids cracking and increases the life of the structure without increasing its thickness and with no deleterious effect on its compressive strength, i.e.: its load carrying capacity. It is hypothesized that when a structure which has been stabilized with a combination of chemical and cement is subjected to an axle overload, the solidified chemical matrix flexes without breaking or cracking, and thereby assumes a larger proportionate share of the overload than the cement. So long as the share of the load assumed by the cement does not exceed the permanent deformation or breaking strength of the cement, no cracking will occur and the structure will remain unitary.

EXAMPLE 7

In one test, four parts by weight of dune sand were mixed with one part by weight of Portland Cement, and five cc of chemical were added per kg of the sand-cement mixture. Beam and compression cylinders were then moulded at 5.5% moisture and were allowed to cure at 50° C. for 28 days. The cylinders were then tested in triplicate at 10° C., 20° C., and 50° C. Similar beam and compression cylinders were also moulded using only Portland Cement, and were tested at 20° C. after curing at 50° C. for 28 days. The results were as follows:

|  | Cement plus chemical | | Cement | |
| --- | --- | --- | --- | --- |
|  | tested at 10° C | tested at 20° C | tested at 50° C | tested at 20° C |
| tensile strength, kg/cm | 13.2 | 9.0 | 6.6 | 5.4 |
| tensile strain × $10^{-4}$ | 7 | 8 | 8 | 5 |
| comp. strength, kg/cm$^2$ | 5.0 | 3.5 | 2.8 | 3.9 |

EXAMPLE 8

The following tests were conducted on highly plastic road base soil having an untreated, soaked CBR of only about 5.

Road base soil was treated with the chemical at the rate of 5 cc per kg of dry soil, together with 3% of Portland cement by weight of dry soil. The mixture was moulded at optimum moisture content, oven dried at 60° C until about 3% moisture was reached and then soaked 48 hours before testing. The following results were recorded:

CBR at 0.1 inch = 70
CBR at 0.2 inch = 97
moisture before soaking = 3.7
moisture after soaking = 15.3
percent swell upon soaking = nil Thereafter, flexural and compressive strengths of soil, treated as above, as well as treated with 3% cement only, cured as described, and tested dry were determined and noted as follows:

|  | 5.0cc chemical + 3% cement | 3% cement only |
| --- | --- | --- |
| tensile strength, kg/cm$^2$ | 3.7 | 1.0 |
| ultimate tensile strain | 21 × $10^{-4}$ | 12 × $10^{-4}$ |
| modulus of deformation, kg/cm2 | 2400 | 1160 |
| unconfined compressive strength, kg/cm220 | 20 | 16 |

The addition of a very small amount of chemical resulted in almost a 2000% increase in CBR, more than a 250% increase in tensile strength, a 75% increase in UTS, a 107% increase in the modulus of deformation, and a 25% increase in unconfined compressive strength, all of which is particularly noteworthy since no prior investigation provides any basis for anticipation of such a result.

EXAMPLE 9

Sand of the type described below was tested with the following results.

| Tested Material: | Dune sand | | | |
| --- | --- | --- | --- | --- |
| Sieve Analysis: | | | | |
| Sieve | | % Finer by Weight | | |
| 2" | | — | | |
| 1" | | — | | |
| ½" | | — | | |
| ⅜" | | — | | |
| No. 4 | | 100 | | |
| No. 10 | | 99 | | |
| No. 40 | | 69 | | |
| No. 200 | | 14.4 | | |
| Sand Equivalent: | 20 | | | |
| Liquid Limit: | 23 | | | |
| Plastic Limit: | N.U. | | | |
| Plasticity Index: | non-plastic | | | |
| AASHO Classification: | A-2-4 | | | |
| Optimum Moisture: | 9.9% | | | |
| Proctor Density: | 127.5 lb/cu ft. | | | |
| CBR; Unsoaked/Soaked | | | | |
|  | 1 | 2 | 3 | 4 |
|  | 68/60 | 79/50 | 124/110 | 123/120 |
| % Swell | .11 | .12 | .13 | .09 |

Specimens 1 and 2 had no cement; specimens 3 and 4 contained a small but effective amount, about 2%, of Portland cement.

It should be noted that the top dressing or soil coating referred to above is particularly suitable for use with highly permeable soils, such as AASHO Groups A-1 and A-3. The coating, which may be the chemical earlier described, is field diluted with an appropriate solvent such as turpentine, and thereafter may be sprayed directly over a base course which has been stabilized as above to form an extremely tough, waterproof, skid resistant, and abrasion resistant surface suitable for the most severe traffic. The material may be colored, green or black for example, for color delineation and added ultravoilet protection. Usual rate applications may vary from between 1 to 4 liters per square meter, and allowed to cure 24-28 hours before opening to traffic. A typical coating can be applied at the rate of approximately 100,000 square meters per day with a conventional spray truck. For selected uses, such as extremely sandy soils, the chemicalmay be diluted with water only. However, in the vast majority of applications to date, best results are obtained with mineral solvents.

It should also be noted that soils which have been stabilized according to this invention have a Marshall stability which is equal to or better than asphaltic concrete at the highest temperatures encountered in desert areas. In one experiment a cross section of a road prepared from a conventional asphalt and a cross section of a road built according to the present invention were each soaked for 2 days in 60° C water. Thereafter each was subjected to a Marshall stability determination with the result that the Marshall stability of the chemically stabilized soil was about 1,000, and for the asphalt, about 300.

The invention is particularly well adapted for the stabilization of sand dunes and slopes or, in a broader sense, the preservation of natural contours. Typical applications are airport and road shoulders, sidewalks, parking areas, road slopes, light traffic areas, sand dunes and untrafficked areas.

Examples of use of the invention and applications in which the resulting surface is intended to support intermittent loads, such as airport shoulders, road shoulders, sidewalks, or parking areas as follows.

EXAMPLE 10

The strip of soil to be treated, as in the case of airport shoulders, road shoulders, bicycle paths, or sidewalks, or the area to be treated, is in the case of parking areas, is first scraped or otherwise worked to eliminate large stones and other objects which would tend to preclude a good bond being formed between adjacent particles or grains in the final surface. Preferably, the soil should be compacted after scraping, leveling and/or screening to remove large objects.

Thereafter, a solution composed of about 160 cc of Chemical A per 2 to 3 liters of water is sprayed over each one square meter area. Penetration over compacted desert soil to a depth of about 1 to 1.5 cms will result. After a curing period of about 1 to 3 days, a tough, flexible membrane capable of supporting occasional loads will result.

EXAMPLE 11

For side slope use, the following procedure has been suuccessfully used.

A mixture consisting of about 80 cc's of Chemical A mixed with 3 to 7 liters of water, and preferably about 5 to 7 liters of water, is sprayed over each one square meter of area. Penetration in porous sand is approximately 2 to 3 centimeters. Application is preferably done when the surface is dry, and no rain has recently fallen or is expected. After a curing period of about 1 to 2 days, a tough, flexible membrane is formed capable of supporting light traffic.

EXAMPLE 12

A large area of about 1,300,000 square yards of sandy soil in an airport was treated as follows.

The top 4" layer of soil was scarified using a Howard Unimix machine. The prior treatment was essentially an oil base derivative coat. The scarifying action broke up the existingg, degenerated soil coating into small particles whereby the soil was better prepared to accept the following chemical treatment. After scarifying, Chemical A was spray applied at a rate of 110 U.S. gallons per 4,050 square meters using a Howard Unimix machine. The equipment included a 3,500 gallon tanker truck which moved in front of the Unimix machine to spray the diluted chemical over the soil prior to mixing with the Unimix machine.

The chemical was diluted in the ratio of 1 gallon of concentrated chemical to 100 gallons of water. After application the soil was compacted with a rubber wheel roller of an 8 to 14 ton size, using several passes, and usually about 5.

Thereafter, the surface was compacted with a steel roller, which resulted in a smooth look. The result was a waterproof, 3 inch deep, uniform, stable base which permitted occasional light traffic after hardening. Eighty percent of the hardness occurred within the first week after treatment, and full hardness was reached after about 30 days.

Optionally, a soil coating as above described can be applied to the treated base at the rate of about 110 U.S. gallons per 4,050 meters square, the chemical being mixed in the proportion of about 2 - 4 parts of water per part of chemical, depending upon site requirements. A typical depth penetration should be about ½ inch to 1 inch, the depth of penetration being controllable by the water content and the time lapse between completion of the prior treatment and the application of the soil dressing. The soil dressing may be sprayed by any suitable device. In one case, a large 250 gallon tank was mounted on the above-mentioned steel roller, and the spray was applied immediately beind the steel roller. Color, such as green, was included in the top dressing so that the eventual surface had a pleasing green color. After a curing time of about 1 - 2 days, the surface was capable of accepting light traffic.

Several methods of destroying or stabilizing loose soil accumulations, such as sand dunes, are well known, including transposing, trenching, planting, paving, panelling, fencing and oiling.

All these methods, however, have one or more serious drawbacks, most notably cost, when large-scale projections must be carried out.

Thus, for example, transposing, which is merely the direct removal of material from the particular location which is threatened, is unfeasible for large-scale operations because of its extremely high cost, since it inevitably requires endless belt conveyors, bulldozers, drag lines, and other heavy equipment.

Trenching, which contemplates dune destruction by means of cutting, as by bulldozing, either transverse or longitudinal trenches across a dune, so as to destroy its symmetry, is highly effective on a temporary basis. However, unless the trenches are re-dug periodically, a profile of equilibrium will eventually result, and the sand pile will no longer be stabilized.

Planting results in the most esthetically pleasing ground treatment, but it is extremely expensive, requires sufficient water to ensure development of the cover, and requires long-range planning and maintenance.

Paving is also sufficient, but again is quite expensive on a large-scale project.

Panelling, which involves the erection of solid barriers immediately to the windward side of the objects or areas to be protected, is efficient and permanent, but the cost is high.

Fencing is a modification of panelling and can be highly effective when properly applied. However, again, although less expensive than panelling, the cost is invariably too high for use on large scale projects.

Oiling is perhaps the most widely used means of stabilizing loose soil accumulations. The effect is only temporary however since the penetration is almost invariably quite shallow, and the coating oxidizes upon exposure to sun and air, becomes brittle, breaks up and blows away. This may occur in as short a time as six months. In addition, oiling is difficult to work with since it is messy, will not support loads after it is applied, and is environmentally deleterious since it kills plant and precludes regeneration of succeeding plant growth until it is broken up.

Surface treatment with the present invention is an efficient and inexpensive method of achieving the fundamental objective of sand dune destruction and stabilization. In addition, it has the further advantage over fencing of increasing the saltation coefficient of the flowing material over the treated surface. As those skilled in the art appreciate, saltation is that form of eolian sand movement by which grains unable to remain in true suspension fall to the ground and rebound in a definite trajectory which is dependent on the relationship between gain, mass, and wind gradient.

The sand symmetry may be destroyed by selective treatment of either the center or the horns of the done, and this system has been found to be least expensive and most practicable. Protection of road, railroad, and tank grades, stabilization of the ground strip along which impounding or diversion barriers are erected, immediate stoppage of sand dune migration and stabilization of exposed sand lying between an impounding fence and an area to be protected are all objectives achieved by application of the invention.

Surface treatment with the present invention has the further advantages, as compared to oiling which is perhaps the currently most widely used system, of not oxidizing or otherwise quickly deteriorating due to exposure to sun and air, is long lasting, provides a hard surface capable of accepting foot loads and other occasional heavier loads, can be applied to almost any desired depth of penetration, the only practical limitation being economic since the greater the quantity applied, the greater the depth of penetration, and remains flexible. In addition, the surface can have imparted to it a pleasing green color, or any other desired color, and will not retard plant growth. In fact, the surface treatment of the invention provides an excellent method of reforesting barren areas.

EXAMPLE 13

In a specific application, 50 cc's of chemical A should be mixed with 4 to 5 liters of water and sprayed over each 1 square meter of area. Spraying may be done in strips. In one application, strips of 2½ meters in width were used in conjunction with a gap of 5 meters of untreated sand between adjacent strips. Sand movement was completely controlled. Penetration at the above rates is approximately 2 to 3 centimeters in dune sand. After 1 to 2 days of curing, a tough, flexible membrane, 2 to 3 centimeters thick is formed which resists the natural conditions of heat and wind, and retains sufficient hardness to resist light loads. The life of the treated sand is expected to be about 10 years. This life span should be contrasted to the life span of petroleum derivative products, which may be only about one-tenth as long.

EXAMPLE 14

The formulation described in Example 13 was made up, together with seeds. The resultant mixture was applied as above described in Example 13. The resultant soil mass could not be blown away by the winds and, as a consequence, the seeds were able to germinate and a ground cover established. It should be noted that the flexible membrane, though continuous, does not preclude the absorption of moisture from occasional rains by the soil, so that whatever precipitation occurs is made available to the seeds.

If desired, seeds of plants which germinate at different rates may be incorporated in the mixture. For example, seeds of quick germinating grasses and seeds of slower germinating plants, or plants which require shade or which thrive best in conjunction with an established ground cover, may be incorporated in the same mixture. In the first stage of germination the quick growing grasses become established. In a succeeding stage, slower germinating plants, or plants which thrive best in conjunction with an established ground cover develop. Additional stages can of course be provided.

Another field of application of the invention is agricultural reclamation.

In certain areas the existing soil is not suitable for agricultural purposes, either because it is so porous that the infrequent rainfall cannot be taken advantage of due to the rather fast runoff, or the soil is simply not arable.

The system of the invention will be particularly well adapted for use in conjunction with agricultural reclamation of the type in which top soil is transposed from one area to a designated area for the purpose of establishing tillable acreage in an area where rainfall, though usually infrequent, is sufficient to raise crops if substantially more efficiently utilized; that is, if the rate of runoff can be slowed so that a greater proportion of the precipitation is available for plant growth.

In this connection, a large area of loose soil in a potentially tillable area may be treated with the chemical of the invention to form a membrane which functions as a barrier to water absorption. Solutions of chemical to water are selected which will provide minimum porosity in the final soil structure. Thereafter tillable soil is placed over the treated surface to any desired depth, and preferably to a depth slightly greater than the depth to which the soil will be disturbed by subsequent working, such as ploughing or harrowing. Subsequent rainfall is thereby better utilized since the barrier provided by the treated sub-surface layer holds the water near the tillable layer after receiving precipitation for a substantially longer period of time than would otherwise be the case in the absence of the water barrier layer.

The terms and description used in the foregoing specification and the hereinafter appended claims are intended to have the same meaning as the meaning understood by highway and soil engineers. In particular, the term "soil" is used to mean any earth material that the highway engineer encounters in his work, except embedded rock and shale, which definition will be found in PCA Soil Primer (EB007.04S) Portland Cement Association, 1973, page 5.

Although a preferred form of the invention and several alternatives, have been described, it will be understood by those skilled in the field that variations therefrom, and analogous uses, are within the knowledge of those skilled in the art. Accordingly, it is intended that the scope of the invention be defined, not by the scope of the foregoing description, but rather by the scope of the claims as interpreted in view of the pertinent prior art.

We claim:

1. An epoxy resin ester-based soil stabilizing composition at a dilution sufficient to be applicable to said soil in an amount providing about 0.1 to about 1 weight percent of the epoxy resin ester in said soil, and capable of maintaining the individual particles of said soil in fixed relative positions for an extended period of time when exposed to natural environmental conditions and subjected to applied mechanical stresses, said soil stabilizing composition comprising an epoxy resin ester which is the reaction product of bisphenol A-glycidyl ether type epoxy resin with fatty acids of an oil which is a member of the group consisting of a drying oil and a semi-drying oil, water, a solvent for said reaction product and an emulsifying agent having the characteristics of providing a shelf stability of substantial duration to the soil stabilizing composition in a concentrated condition while permitting dilution with water, said soil stabilizing composition containing no more than about 10 percent free fatty acids.

2. The soil stabilizing composition of claim 1 further characterized in that said epoxy resin ester is the reaction product of a bisphenol A-glycidyl ether type epoxy resin with linseed fatty acids in which the molar ratio of fatty acids to bisphenol A units is between about 0.5 to 1.0 together with free fatty acids.

3. The soil-stabilizing composition of claim 1 wherein the solvent is a volatile solvent.

4. The soil-stabilizing composition of claim 3 further characterized in that the solvent is an aromatic hydrocarbon.

5. The soil-stabilizing composition of claim 1 wherein the water is present in an amount of at least about 25 percent by weight of the soil stabilizing composition.

6. The soil stabilizing composition of claim 1 further including a drier selected from the group consisting of manganese acetate, cobalt acetate, cobalt napthenate and lead drier.

7. The soil stabilizing composition of claim 1 further characterized in that the emulsifying agent is selected from the group consisting of polyethoxylated phenols, polyethoxylated alcohols, and polyethoxyleted polyamines.

8. The soil stabilizing composition of claim 7 further characterized in that said epoxy resin ester is the reaction product of a bisphenol A-glycidyl ether type epoxy resin with linseed fatty acids in which the molar ratio of fatty acids to bisphenol A units is between about .5 to 1.0 together with free fatty acids.

9. The soil stabilizing composition of claim 1 further characterized in that the water is present in an amount of about one-third of the total weight of the soil stabilizer.

10. An epoxy resin ester-based soil stabilizing composition at a dilution sufficient to be applicable to said soil in an amount providing about 0.1 to about 1 weight percent of said epoxy resin ester in said soil, and capable of maintaining the individual particles of said soil in fixed relative positions for an extended period of time when exposed to natural environmental conditions and subjected to applied mechanical stresses, said soil stabilizing composition comprising an epoxy resin ester which is the reaction product of bisphenol A-glycidyl ether type epoxy resin with fatty acids of an oil which is a member of the group consisting of a drying oil and a semi-drying oil, water, a solvent for said reaction product, a drier present in an amount of about 1/100 to about 1/1000 of the weight of said epoxy resin ester, and an emulsifying agent having the characteristics of providing a shelf stability of substantial duration to the soil stabilizing composition in a concentrated condition while permitting dilution with water; said soil stabilizing composition containing no more than about 10 percent free fatty acids.

11. The soil stabilizing composition of claim 1 further characterized in that said epoxy resin ester is the reaction product of a bisphenol A-glycidyl ether type epoxy resin with linseed fatty acids in which the molar ratio of fatty acids to bisphenol A units is between about .5 to 1.0 together with free fatty acids.

12. The soil-stabilizing composition of claim 10 wherein the solvent is a volatile solvent.

13. The soil stabilizing composition of claim 10 further characterized in that the drier is selected from the group consisting of manganese acetate, cobalt acetate, cobalt naphthenate and/or lead drier.

14. The soil stabilizing composition of claim 13 further characterized in that the drier is manganese acetate.

15. The soil stabilizing composition of claim 13 further characterized in that the water is present in an amount of about one-third of the total weight of the soil stabilizer.

* * * * *